(12) United States Patent
German et al.

(10) Patent No.: US 6,285,293 B1
(45) Date of Patent: Sep. 4, 2001

(54) SYSTEM AND METHOD FOR ADDRESSING AND TRACING PATCH CORDS IN A DEDICATED TELECOMMUNICATIONS SYSTEM

(75) Inventors: Michael Gregory German, Secaucus; Frank S. Leone, Berkeley Heights, both of NJ (US); Daniel Warren Macauley, Fishers, GA (US); Lawrence Marc Paul, Randolph, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/247,613

(22) Filed: Feb. 10, 1999

(51) Int. Cl.[7] ................................................. G08B 21/00
(52) U.S. Cl. ........................... 340/687; 340/686; 439/490
(58) Field of Search .................................. 340/687, 686, 340/540, 500, 815.47, 815.48; 439/490, 489; 379/9

(56) References Cited

U.S. PATENT DOCUMENTS

| | | | |
|---|---|---|---|
| 3,573,789 | 4/1971 | Sharp et al. | 345/132 |
| 3,573,792 | 4/1971 | Reed | 345/55 |
| 3,914,561 | * 10/1975 | Schardt et al. | 379/9 |
| 4,072,827 | * 2/1978 | Oman | 179/42 |
| 4,096,359 | * 6/1978 | Barsellotti | 179/99 |
| 5,111,408 | 5/1992 | Amjadi | 345/327 |
| 5,265,187 | * 11/1993 | Morin et al. | 385/135 |
| 5,305,405 | * 4/1994 | Emmons et al. | 385/73 |
| 5,353,367 | * 10/1994 | Czosnowski et al. | 385/135 |
| 5,483,467 | * 1/1996 | Krupka et al. | 364/550 |
| 5,550,755 | 8/1996 | Martin et al. | 340/825.36 |
| 5,726,635 | * 3/1998 | Tsuhara et al. | 340/687 |
| 5,754,112 | * 5/1998 | Novak | 340/687 |
| 5,764,043 | * 6/1998 | Czosnowski et al. | 324/66 |
| 5,876,240 | * 3/1999 | Derstine et al. | 340/815.47 |

* cited by examiner

Primary Examiner—Jeffrey Hofsass
Assistant Examiner—Sihong Huang
(74) Attorney, Agent, or Firm—Gibbons, Del Deo, Dolan, Griffinger & Vecchione

(57) ABSTRACT

A patch cord tracing system and method for tracing patch cords in a telecommunications patching system. The system includes a plurality of tracing interface modules that attach to the patch panels in a telecommunications closet. On the patch panels in a telecommunications closet are located a plurality of connector ports that receive the terminated ends of patch cords. The tracing interface modules mount to the patch panels and provide a sensor, an LED and a tracing button to each of the connector ports. The sensor detects whenever a patch cord is connected to, or removed from, a connector port. Accordingly, by connecting a computer controller to the various sensors, the computer controller can monitor and log all changes to the patch cord interconnections in an automated fashion.

17 Claims, 4 Drawing Sheets

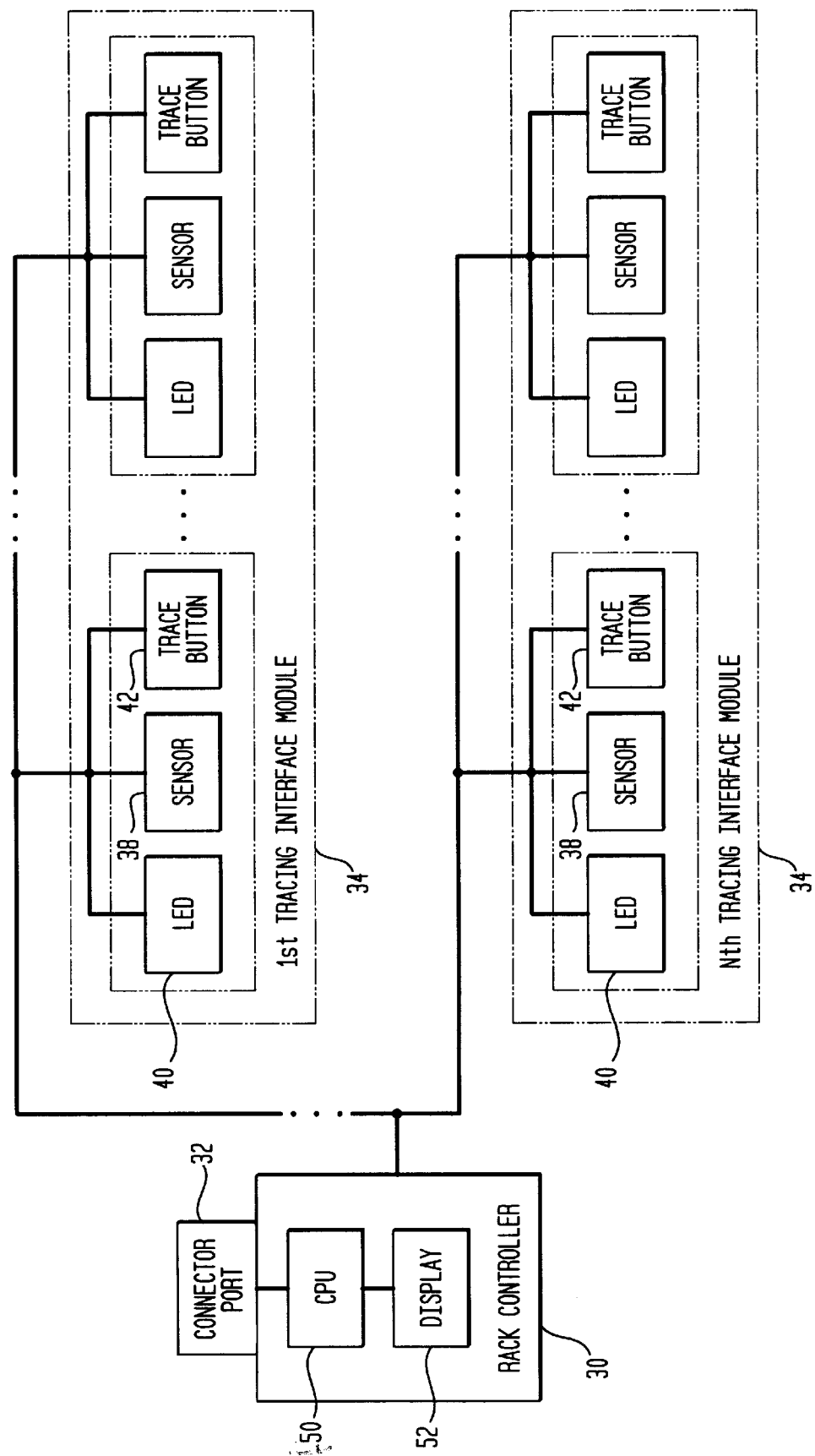

SYSTEM AND METHOD FOR ADDRESSING AND TRACING PATCH CORDS IN A DEDICATED TELECOMMUNICATIONS SYSTEM

RELATED APPLICATIONS

This application is related to the following co-pending applications, the disclosures of which are incorporated into this specification by reference.

U.S. patent application Ser. No. 09/247,614, entitled SYSTEM AND METHOD OF OPERATION FOR A TELECOMMUNICATIONS PATCH SYSTEM;

U.S. patent application Ser. No. 09/247,269, entitled TRACING INTERFACE MODULE FOR PATCH CORDS IN A TELECOMMUNICATIONS PATCH SYSTEM;

U.S. patent application Ser. No. 09/247,385, entitled DISPLAY PANEL OVERLAY STRUCTURE AND METHOD FOR TRACING INTERFACE MODULES IN A TELECOMMUNICATIONS PATCH SYSTEM;

U.S. patent application Ser. No. 09247,270, entitled METHOD AND DEVICE FOR DETECTING THE PRESENCE OF A PATCH CORD CONNECTOR IN A TELECOMMUNICATIONS PATCH SYSTEM;

U.S. patent application Ser. No. 09/247,237, entitled METHOD AND DEVICE FOR DETECTING THE PRESENCE OF A PATCH CORD CONNECTOR IN A TELECOMMUNICATIONS PATCH SYSTEM USING PASSIVE DETECTION SENSORS;

U.S. patent application Ser. No. 09/404,420, entitled SYSTEM AND METHOD FOR IDENTIFYING SPECIFIC PATH CORD CONNECTORS IN A TELECOMMUNICATIONS PATCH SYSTEM, and U.S. patent application Ser. No. 09/404,619, entitled SYSTEM AND METHOD OF INTERCONNECTING TRACING INTERFACE MODULES TO A CENTRAL CONTROLLER IN A TELECOMMUNICATIONS PATCH SYSTEM.

BACKGROUND OF THE INVENTION

1. Field of the Invention

The present invention relates to the structure and method of operations of dedicated telecommunications patching systems where telecommunications lines are selectively coupled to one another in a telecommunications closet using patch cords. More particularly, the present invent relates to telecommunication patching systems that embody patch cord tracing capabilities that help a technician locate the opposite ends of a specific patch cord within the system.

The present invention also relates to systems that enable a technician to transmit and receive data with a telecommunications system from a remote location.

2. Description of the Prior Art

Many- businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunications line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or a RJ-11 telecommunications connector. One end of the patch cord 20 is connected to the connector port 16 of a first telecommunications line and the opposite end of the cord is connected to the connector port 16 of a second telecommunications line. By selectively connecting the various lines of the patch cords 20, any combination of telecommunications lines can be interconnected.

In many businesses, employees are assigned their own computer network access number exchange so that the employee can interface with the companies main frame computer or computer network. When an employee changes office locations, it is not desirable to provide that employee with newly addressed telecommunication connection ports. Rather, to preserve consistency in communications, it is preferred that the exchanges of the telecommunication connection ports in the employee's old office be transferred to the telecommunications ports in the employer's new office. To accomplish this task, the patch cords in the telecommunication closet are rearranged so that the employee's old exchanges are now received in his/her new office.

As employees, move, change positions, add lines and subtract lines, the patch cords in a typical telecommunications closet are rearranged quite often. The interconnections of the various patch cords in a telecommunications closet are often logged in either paper or computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that: technician manually traces that patch cord between an internal line and an external line. To preform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidently go from one patch cord to another during a manual trace. Such errors result in misconnected telecommunication lines which must be later identified and corrected.

A need therefore exists in the field of telecommunication patching systems for a system that can trace and identify the ends of each patch cord in a telecommunications closet in an automated fashion, thereby reducing the labor and inaccuracy of manual tracing procedures.

SUMMARY OF THE INVENTION

The present invention is a patch cord tracing system and method for tracing patch cords in a telecommunications patching system. The system includes a plurality of tracing interface modules that attach to the patch panels in a telecommunications closet. On the patch panels in a telecommunications closet are located a plurality of connector ports that receive the terminated ends of patch cords. The tracing interface modules mount to the patch panels and provide a sensor, an LED and a tracing button to each of the connector ports. The sensor detects whenever a patch cord is connected to, or removed from, a connector port. Accordingly, by connecting a computer controller to the various sensors, the computer controller can monitor and log all changes to the patch cord interconnections in an automated fashion.

Additionally, by interconnecting the various LEDs and trace buttons to the same computer controller, the computer controller can initiate an automated trace of any patch cord upon the pressing of any trace button. Once a trace button associated with one end of a patch cord is pressed, the computer controller can locate the opposite end of that patch cord and can light the LED at the opposite end of that patch cord. This enables a technician to easily find the opposite end of a selected patch cord without having to manually trace the patch cord from end to end.

BRIEF DESCRIPTION OF THE DRAWINGS

For a better understanding of the present invention, reference is made to the following description of and exemplary embodiment thereof, considered in conjunction with the accompanying drawings, in which:

FIG. 4 is a schematic view of the present invention tracing system.

DETAILED DESCRIPTION OF THE DRAWINGS

Figure 1:
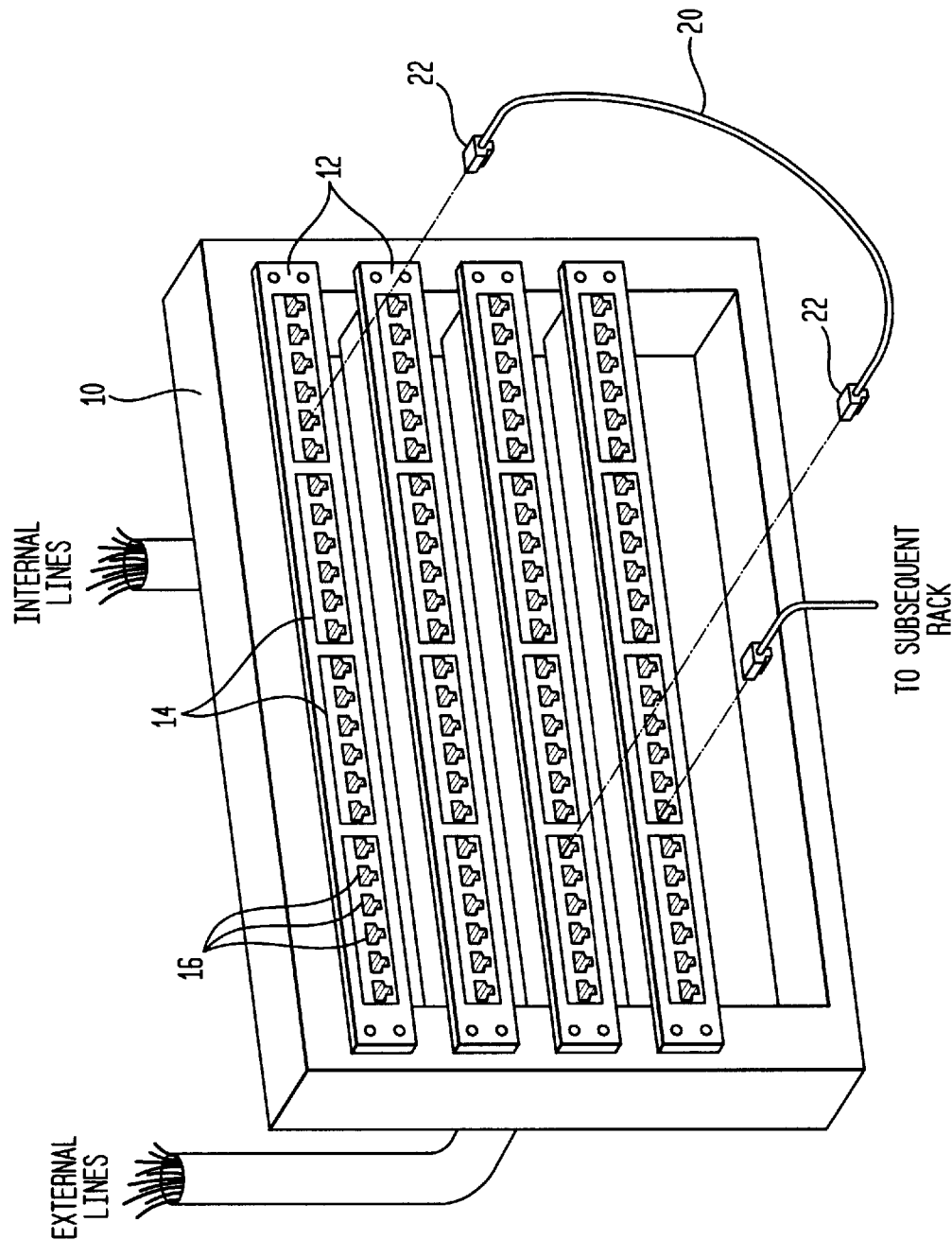
FIG. 1 is a perspective view of a typical prior art telecommunications rack assembly containing multiple patch panels with connector ports that are selectively interconnected by patch cords.
Figure 2:
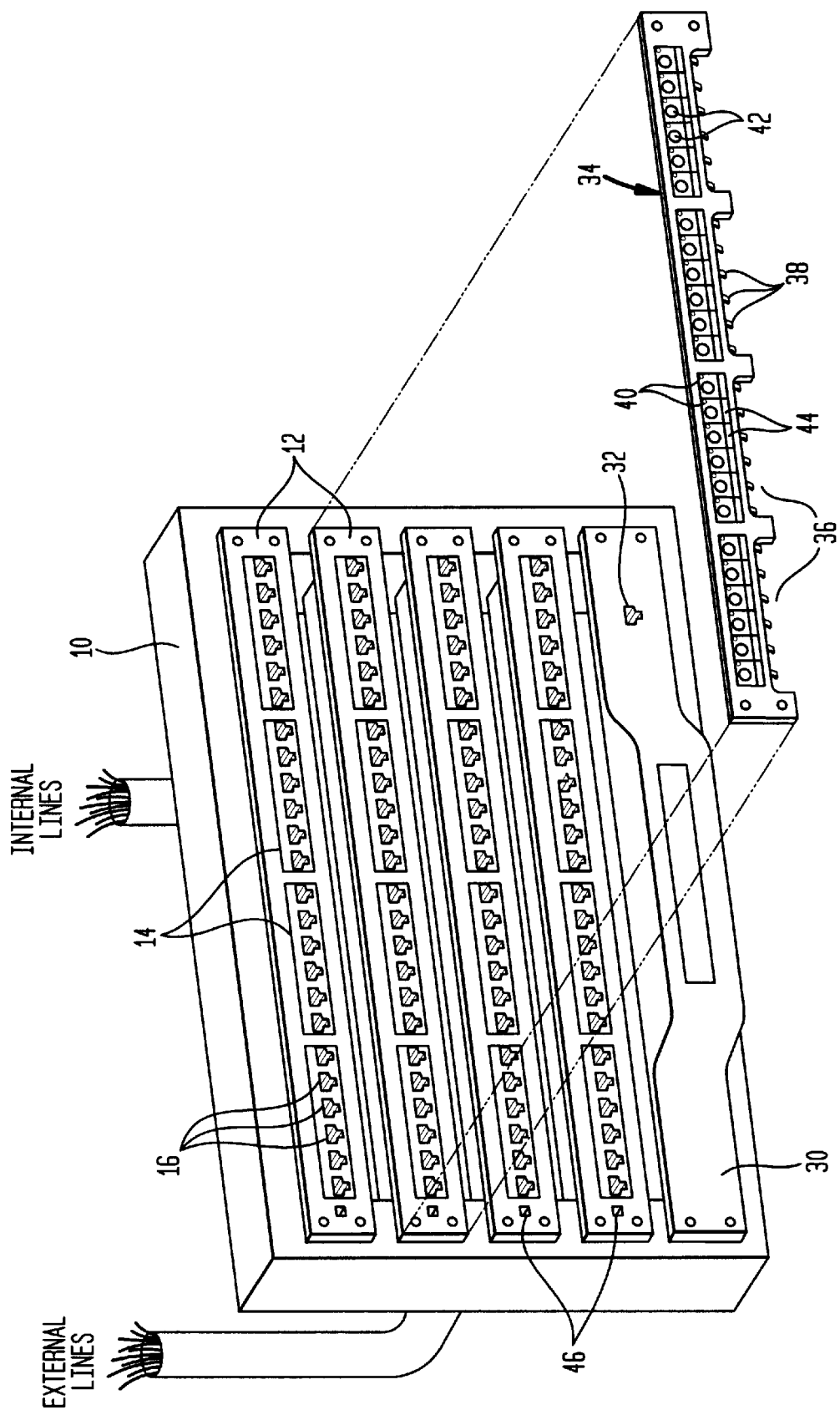
FIG. 2 is a perspective view of a tracing interface module and rack controller in accordance with the present invention, shown in conjunction with the prior art telecommunications rack assembly of FIG. 1.

Referring to FIG. 2, a conventional telecommunications rack 10 is shown, such as the one previously described in regard to FIG. 1. The telecommunications rack 10 contains a plurality of patch panels 12 that are mounted in parallel horizontal rows within the rack 10. Each of the patch panels 12 contain a plurality of port assemblies 14. The connector ports 16 associated with each of the port assemblies 14 are hard wired to the incoming external lines or the incoming internal lines.

In the present invention system, a rack controller 30 is mounted to each rack 10 in the overall patch system. The rack controller 30 contains a central processing unit (CPU). If multiple racks are present within the telecommunications closet, the rack controllers on different racks are interconnected with one another so that they can communicate in a common network as if they were a single controller. The CPU is capable of independently running line tracing programs and also contains a remote access port 32 that enables the CPU to be accessed by a remote computer. Remote access of the rack controller is the subject of related co-pending patent application Ser. No. 09/247,614, entitled System And Method Of Operation For A Telecommunications Patch System, which has already been incorporated into this application by reference.

The purpose of the rack controller 30 is to operate and gather data from the various tracing interface modules 34, as will be later explained. The tracing interface modules 34 are modules that mount to the face of each patch panel 12 on the rack 10. The tracing interface modules 34 surround the various connector ports 16 located on patch panels 12 and provide an interface through which data about each connector port 16 can be transmitted to and from the rack controller 30.

The tracing interface module 34 can have multiple different configurations. The structure and different configurations of the tracing modules are disclosed in related co-pending patent application Ser. No. 09/247,269, entitled Tracing Interface Module For Patch Cords In A Telecommunications Patch System; patent application Ser. No. 09/247,385, entitled Display Panel Overlay Structure And Method For Tracing Interface Modules In A Telecommunications System; and patent application Ser. No. 09/247,270, entitled Method And Device For Detecting The Presence Of A Patch Cord Connector In A Telecommunications Patch System. These applications have already been incorporated into this application by reference.

Figure 3:
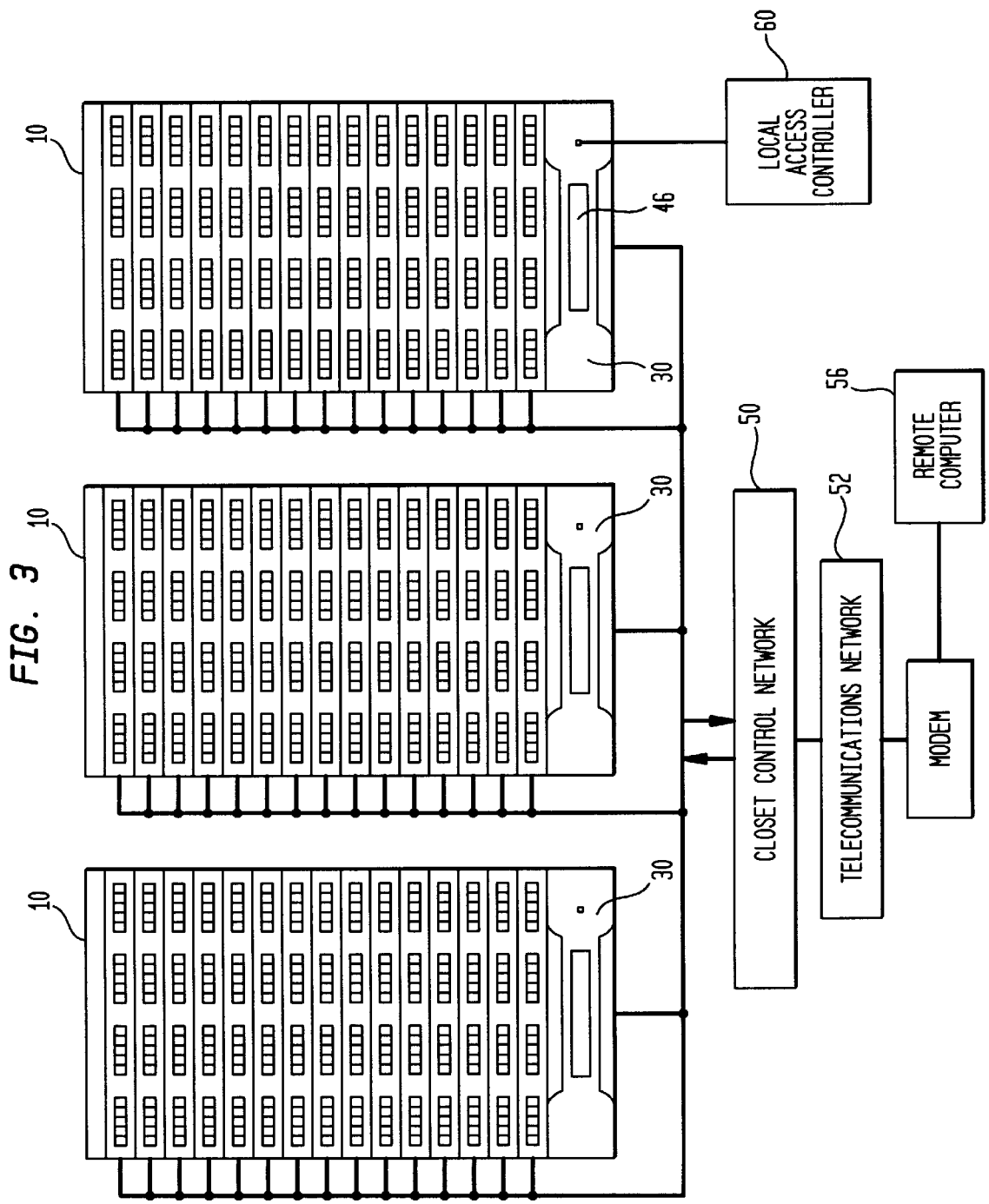
FIG. 3 is an enlarged, fragmented, view of a section of a tracing interface module attached to a prior art patch panel.

In the shown embodiment, the tracing interface module 34 contains a rectangular relief 36 that surrounds the connector ports 16 on each port assembly 14 when the tracing interface module 34 is connected to the patch panels 12. Referring to FIG. 2, in conjunction with FIG. 3, it can be seen that extending into each rectangular relief 36 is a plurality of sensors 38. Each sensor 38 corresponds in position with one of the connector ports 16 on the patch panel 12. As the terminated end of a patch cord 20 (FIG. 1) is connected to a connector port 16, the presence of the patch cord is detected by the rack controller 30. The rack controller 30 is therefore capable of automatically determining when a patch cord has been added or removed from any connector port 16 on the rack 10.

In addition to the sensors 38, the tracing interface module 34 also contains light emitting diodes (LEDs) 40 and tracing buttons 42. An LED 40 and tracing button 42 are provided for each connector port 16 when the tracing interface module 34 is connected to the patch panel 12. Accordingly, once the tracing interface module 34 is in place, each connector port 16 on the patch panel 12 has an LED 40 and tracing button 42 that corresponds in position to that connector port 16.

Indicia may be printed on each of the tracing buttons 42 to help identify the different tracing buttons 42. Additionally, a labeling area 44 is provided below each tracing button 42 for further identification. Each labeling area 42 can be written upon to identify the port in a manner useful to the system's technician.

Referring back to FIG. 2, it can be seen that a small aperture 46 is formed through each patch panel 12 at one end. The tracing interface module 34 contains a connector (not shown) that extends through that aperture 45 when the tracing interface module 34 is connected to the rack 10. A flexible connector cable (not shown) is used to interconnect each tracing interface module 34 to the rack controller 30, utilizing the space behind the patch panels 12. Accordingly, the rack controller 30 is directly connected to all the LEDs 40, trace buttons 42 and sensors 38 on all of the trace interface modules 34. An alternative method of interconnecting the tracing interface modules 34 to the rack controller 30, without requiring an aperture in the patch panels is shown in co-pending patent application Ser. No. 09/404,619, entitled System And Method Of Interconnecting Tracing Interface Modules To A Central Controller In A Telecommunications Patch System.

Referring to FIG. 4, a schematic of the overall system is shown. From FIG. 4, it can be seen that the rack controller 30 contains a CPU 50, a display 52 and a remote access connector port 32. The rack controller 30 is wired to each of the tracing interface modules 34, wherein the rack controller 30 communicates with all of the LEDs 40, trace buttons 42 and sensors 38 that are on each of the tracing interface modules 34.

When a patch cord 20 (FIG. 1) is placed into any connector port 16 (FIG. 2), or removed from any connector port, that change is sensed by a sensor 38 and is read to the CPU 50 in the rack controller 30. The CPU 50 in the rack controller 30 is therefore capable of monitoring any and all changes that occur with respect to the patch cords in the patch system over time. The CPU 50 is therefore also capable of automatically keeping an accurate log of all changes that have occurred with respect to the patch cords since the installation of the present invention system. Accordingly, if a technician is servicing the patch system, that technician can read the accurate log straight from the CPU 50. The log can be read out on the display 52 of the rack controller 30 or can be remotely accessed via the connector port 32 on the rack controller 30.

In addition to keeping an accurate log of all physical patch cord changes, the present invention system can also be used to accurately trace the end points of any patch cord 20 (FIG. 1). For instance, suppose a technician wants to find the opposite end of a particular patch cord. That technician can press the trace button 38 that corresponds in position to the known end of the patch cord. Upon the pressing of the trace button 38, the CPU 50 will review its own log and will determine where the opposite end of that patch cord is located. The CPU 50 will then light the LED 40 that corresponds in position to the opposite end of the targeted patch cord. The technician then need only look for the lit LED 40 on one of the tracing interface modules 34 to find the opposite end of the targeted patch cord. The wasted time and inaccuracy of manually tracing patch cords are eliminated.

In addition to lighting the LEDs 40 to show the ends of the various patch cords, the rack controller 30 may also display instructions or useful information on its display 52 with the use of, for example, alpha numeric characters. For example, the location of a patch cord by rack number and patch panel may be displayed. Alternatively, the identity of the patch cord may be displayed, thereby helping a technician verify that he/she is servicing the correct patch cord.

Since the present invention system contains a rack controller 30, that can be mounted to an existing telecommunications rack, and tracing interface modules 34, that can be mounted to existing patch panels, it should be clear that the present invention tracing system can be retroactively added to many different types of telecommunication patch systems. The rack controller is sized to mount in existing racks. The tracing interface modules are designed with very thin profiles. Accordingly, when added to existing patch systems, the components of the present invention do not require any physical changes to the layout of the telecommunications closet or the position of the patch panels on the racks within that closet.

It will be understood that the embodiment of the present invention specifically shown and described is merely exemplary and that a person skilled in the art can make alternate embodiments using different configurations and functionally equivalent components. For example, there can be many different tracing interface module configurations that can be used in accordance with the present invention, other than the exemplary layout shown. All such alternate embodiments are intended to be included in the scope of this invention as set forth in the following claims.

What is claimed is:

1. In a telecommunications patching system having a plurality of connector ports disposed on at least one patch panel, a system for tracing patch cords from one connector port to another, comprising:

a tracing interface module adapted to be affixed to each patch panel in the telecommunications patching system, wherein each tracing interface module provides a visual indicator, a manually operable trace initiation mechanism, and a sensor for sensing the presence of a patch cord to each of the connector ports located on that patch panel;

a systems controller coupled to each said visual indicator, each said manually operable trace initiation mechanism and each said sensor, wherein said system controller determines from said sensor if a patch cord is connected to each of said connector ports.

2. The system according to claim 1, wherein said at least one patch panel is mounted to a rack and said systems controller is mounted to said rack.

3. The system according to claim 1, wherein each said patch panel has a face surface of a predetermined length and width upon which said connector ports are exposed and each said tracing interface module is sized to mount on said face surface within said length and width without obstructing said connector ports.

4. The system according to claim 1, wherein said visual indicator includes a light emitting diode.

5. The system according to claim 1, wherein said trace initiation mechanism includes a manual signal button.

6. The system according to claim 1, wherein said sensor is a mechanical switch that detects the patch cord when present within a connector port.

7. A telecommunications patching system, comprising:

at least one patch panel containing a plurality of connector ports, wherein each of said connector port is associated with a sensor for detecting the presence of a patch cord in that connector port;

a visual indicator in proximity to each of said connector ports;

a manually operable switch in proximity to each of said connector ports; and a systems controller coupled to said sensor, said manually operable switch and said visual indicator of each of said connector ports, wherein said systems controller determines from each said sensors if a patch cord is connected to each of said connector ports.

8. The system according to claim 7, wherein each said patch panel is mounted to a rack and said systems controller is mounted to said rack.

9. The system according to claim 7, wherein said visual indicator is contained within a module that can be selectively separated from said patch panel.

10. The system according to claim 7, wherein each said patch panel has a face surface of a predetermined length and width upon which said connector ports are exposed and said sensor, said visual indicator and said manually operable switch are all contained within a tracing interface module that is sized to mount on said face surface within said length and width without obstructing said connector ports.

11. A method of determining if a patch cord is present in a connector port on a patch panel in a telecommunications patching system, said method comprising the steps of:

providing a sensor at each of the connector ports, wherein said sensor detects when a patch cord is inserted into that connector port;

providing a manually operable switch button in proximity to each of the connector ports, providing a visual indicator in proximity to each of the connector ports, and coupling each said sensor, said manually operable switch button and said visual indicator to a controller that monitors each said sensor, said manually operable switch button and said visual indicator.

12. The method according to claim 11, wherein said sensor is a mechanical switch that is mechanically triggered by the presence of a patch cord in a connector port.

13. The method according to claim 11, wherein further including the step of having said controller electronically log all changes to connector ports detected by each said sensor.

14. The method according to claim 11, further including the step of providing a visual indicator at each of the connector ports.

15. The method according to claim 11, further including the step of tracing a patch cord and lighting said visual indicator at one end of a patch cord, each time said sensor detects that the opposite end of that patch cord has been removed from a connector port.

16. The method according to claim 11, further including the step of providing a manual switch button at each of the connector ports.

17. The method according to claim 16, wherein each said sensor, each said visual indicator and each said manual switch button is contained within a common module and said step of providing said switch includes connecting said module proximate said connector ports.

\* \* \* \* \*